(12) United States Patent
Cavalieri et al.

(10) Patent No.: US 10,711,080 B2
(45) Date of Patent: Jul. 14, 2020

(54) PROPYLENE COPOLYMERS

(71) Applicant: BASELL POLIOLEFINE ITALIA S.R.L., Milan (IT)

(72) Inventors: Claudio Cavalieri, Ferrara (IT); Paola Massari, Ferrara (IT); Michele Grazzi, Ferrara (IT); Giampaolo Pellegatti, Ferrara (IT); Roberto Pantaleoni, Ferrara (IT)

(73) Assignee: Basell Poliolefine Italia S.r.l., Milan (IT)

(*) Notice: Subject to any disclaimer, the term of this patent is extended or adjusted under 35 U.S.C. 154(b) by 158 days.

(21) Appl. No.: 16/061,164

(22) PCT Filed: Nov. 22, 2016

(86) PCT No.: PCT/EP2016/078415
§ 371 (c)(1),
(2) Date: Jun. 11, 2018

(87) PCT Pub. No.: WO2017/097578
PCT Pub. Date: Jun. 15, 2017

(65) Prior Publication Data
US 2018/0362682 A1 Dec. 20, 2018

(30) Foreign Application Priority Data
Dec. 11, 2015 (EP) .................... 15199653

(51) Int. Cl.
*C08F 210/06* (2006.01)
*C08J 5/18* (2006.01)
*B32B 27/08* (2006.01)
*B32B 27/32* (2006.01)

(52) U.S. Cl.
CPC ............ *C08F 210/06* (2013.01); *B32B 27/08* (2013.01); *B32B 27/32* (2013.01); *C08J 5/18* (2013.01); *B32B 2250/242* (2013.01); *B32B 2307/31* (2013.01); *B32B 2307/40* (2013.01); *B32B 2307/518* (2013.01); *C08F 2800/20* (2013.01); *C08J 2323/14* (2013.01)

(58) Field of Classification Search
CPC .... C08F 210/06; C08F 2800/20; B32B 27/08; B32B 27/32; B32B 2250/242; B32B 2307/31; B32B 2307/40; B32B 2307/518; C08J 5/18; C08J 2323/14
USPC ...................................................... 524/348.2
See application file for complete search history.

(56) References Cited

U.S. PATENT DOCUMENTS

| | | |
|---|---|---|
| 6,576,306 B2 | 6/2003 | Mehta et al. |
| 6,583,227 B2 | 6/2003 | Mehta et al. |
| 6,806,316 B2 | 10/2004 | Mehta et al. |
| 7,026,040 B2 | 4/2006 | Mehta et al. |
| 7,919,561 B2 | 4/2011 | Burkhardt et al. |
| 8,663,763 B2 | 3/2014 | Grazzi et al. |
| 8,779,062 B2 | 7/2014 | Paavilainen et al. |
| 9,096,700 B2 | 8/2015 | Jiang et al. |
| 9,273,201 B2 | 3/2016 | Reichelt et al. |
| 9,611,338 B2 | 4/2017 | Pellegatti et al. |
| 10,065,398 B2 | 9/2018 | Resconi et al. |
| 10,544,271 B2 | 1/2020 | Pellegatti et al. |
| 2003/0105237 A1 | 6/2003 | Winter et al. |
| 2010/0305276 A1 | 12/2010 | Pellegatti et al. |
| 2011/0104416 A1 | 5/2011 | Bernreitner et al. |
| 2011/0118370 A1 | 5/2011 | Jiang et al. |
| 2014/0079899 A1 | 3/2014 | Bernreitner et al. |
| 2016/0319095 A1* | 11/2016 | Yoshida .............. C08J 9/0066 |

FOREIGN PATENT DOCUMENTS

| | | |
|---|---|---|
| CN | 1498231 A | 5/2004 |
| CN | 102666678 A | 9/2012 |
| CN | 103298875 A | 9/2013 |
| EP | 2487203 A1 | 8/2012 |
| JP | H03160006 A | 7/1991 |
| JP | 2011506717 A | 3/2011 |
| JP | 2014520016 A | 8/2014 |
| RU | 2471813 C2 | 1/2013 |
| WO | 2012093099 A1 | 7/2012 |
| WO | 2014154610 A1 | 10/2014 |
| WO | 2015062787 A1 | 5/2015 |

OTHER PUBLICATIONS

International Search Report and Written Opinion dated Feb. 22, 2017 (Feb. 22, 2017) for Corresponding PCT/EP2016/078415.

* cited by examiner

*Primary Examiner* — William K Cheung

(57) ABSTRACT

A propylene 1-hexene copolymer containing from about 5.5 to about 9.0% by weight, based upon the total weight of the copolymer, of 1-hexene derived units having:
a) two melting temperature peaks in the DSC plot having a difference in height ranging from 0 to 5 mW;
b) the higher melting temperature, measured by DSC, ranging from about 141.0° C. to about 151.0° C.; and
c) Melt Flow Rate (MFR, measured according to ASTM D 1238, 230° C./2.16 kg) from about 3.5 to about 8.0 g/10 min.

8 Claims, No Drawings

PROPYLENE COPOLYMERS

This application is the U.S. National Phase of PCT International Application PCT/EP2016/078415, filed Nov. 22, 2016, claiming benefit of priority to European Patent Application No. 15199653.5, filed Dec. 11, 2015, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to copolymers of propylene with 1-hexene and films made therefrom.

BACKGROUND OF THE INVENTION

For some pipe applications, copolymers of propylene and 1-hexene, having from about 0.2 to about 5 wt %, based upon the total weight of the copolymer, of 1-hexene derived units and a monomodal, molecular weight distribution, are used.

For some industrial sheet applications, multimodal copolymers of propylene and 1-hexene, having from about 0.6 wt % to about 3.0 wt %, based upon the total weight of the copolymer, of 1-hexene derived units, are used.

SUMMARY OF THE INVENTION

In a general embodiment, the present disclosure provides a propylene 1-hexene copolymer containing from about 5.5 to about 9.0% by weight, based upon the total weight of the copolymer, of 1-hexene derived units, having:
  a) two melting temperature peaks in the DSC plot having a difference in height ranging from about 0 to about 5 mW;
  b) the higher melting temperature, measured by DSC, ranging from about 141.0° C. to about 151.0° C.; and
  c) Melt Flow Rate (MFR, measured according to ASTM D 1238 at 230° C., with a load of 2.16 kg) from about 3.5 to about 8.0 g/10 min.

DETAILED DESCRIPTION OF THE INVENTION

In a general embodiment, the present disclosure provides a propylene 1-hexene copolymer containing from about 5.5 to about 9.0% by weight, based upon the total weight of the copolymer, of 1-hexene derived units, alternatively from about 6.0 to about 8.5% by weight, alternatively from about 6.5 to about 8.0% by weight, having:
  a) two melting temperature peaks in the DSC plot having a difference in height ranging from about 0 to about 5 mW, alternatively from 0 to 3 mW;
  b) the higher melting temperature, measured by DSC, ranging from about 141.0° C. to about 151.0° C., alternatively from about 142.0° C. to about 149.0° C., alternatively from about 142.5° C. to about 145.0° C.; and
  c) Melt Flow Rate (MFR, measured according to ASTM D 1238 at 230° C., with a load of 2.16 kg) from about 3.5 to about 8.0 g/10 min, alternatively from about 3.8 to about 7.5 g/10 min, alternatively from about 4.0 to about 6.0 g/10 min.

In some embodiments, the difference of the melting temperature of the two melting temperature peaks ranges from about 5° C. to about 30° C., alternatively from about 7° C. to about 15° C., alternatively from about 8° C. to about 12° C.

In some embodiments, the propylene 1-hexene copolymer is free of comonomer units other than propylene and 1-hexene derived units.

As used herein, a melting temperature peak in the DSC curve (temperature/heat of fusion (mW)) is defined as a point on the DSC curve (temperature/heat of fusion (mW)) having the highest value of heat of fusion at a temperature A with respect to the values of heat of fusion (mW) in the range ±1° C. with respect to temperature A.

As used herein, the amounts of 1-hexene units are referred to the total weight of the copolymer.

The melting temperature values are determined by differential scanning calorimetry (DSC), according to ISO 11357-3, with a heating rate of 20° C./minute.

In some embodiments, the copolymers of the present disclosure have a solubility in xylene at 25° C. equal to or lower than about 25% by weight, based upon the total weight of the copolymer, and higher than about 12 wt %, alternatively to or lower than about 20% by weight.

In some embodiments, the propylene 1-hexene copolymer is obtained with polymerization processes carried out in the presence of stereospecific Ziegler-Natta catalysts supported on magnesium dihalides. In some embodiments, the process incorporates a molecular weight regulator. In some embodiments, the molecular weight regulator is hydrogen.

In some embodiments, the polymerization process is (a) continuous or batch and (b) carried out in a gas phase, in a liquid phase, or by mixed liquid-gas techniques. In some embodiments, the liquid phase is in the presence of inert diluent. In some embodiments, the polymerization in gas phase is carried out in two reactors.

In some embodiments, the polymerization reaction time, pressure and temperature can vary. In some embodiments, the temperature is from about 20 to about 100° C. In some embodiments, the pressure is atmospheric or higher.

In some embodiments, the stereospecific polymerization catalysts are made from or contain the product of the reaction between:
  1) a solid component, containing a titanium compound and an electron-donor compound (internal donor) supported on magnesium dihalide;
  2) an aluminum alkyl compound (cocatalyst); and, optionally, and
  3) an electron-donor compound (external donor).

In some embodiments, the halogen in the magnesium dihalide is chlorine. In some embodiments, the catalysts are capable of producing homopolymers of propylene having an isotactic index higher than about 90% (measured as weight amount of the fraction insoluble in xylene at room temperature).

In some embodiments, the solid catalyst component (1) contains, as an electron-donor, a compound selected from the group consisting of ethers, ketones, lactones, compounds containing N, P and/or S atoms, and mono- and dicarboxylic acid esters.

In some embodiments, the catalyst is selected from the group of catalysts described in U.S. Pat. No. 4,399,054 and European Patent No. 45977, both incorporated herein by reference in their entirety.

In some embodiments, the electron-donor compounds are selected from the group consisting of phthalic acid esters and succinic acid esters.

In some embodiments, the succinic acid esters are represented by the formula (I):

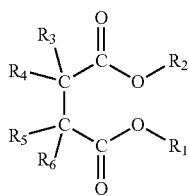

(I)

wherein the radicals $R_1$ and $R_2$, equal to or different from each other, are a C1-C20 linear or branched alkyl, alkenyl, cycloalkyl, aryl, arylalkyl or alkylaryl group, optionally containing heteroatoms; the radicals $R_3$ to $R_6$ equal to or different from each other, are hydrogen or a C1-C20 linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

In some embodiments, $R_1$ and $R_2$ are selected from the group consisting of C1-C8 alkyl, cycloalkyl, aryl, arylalkyl and alkylaryl groups. In some embodiments, $R_1$ and $R_2$ are selected from the group consisting of primary alkyls, alternatively branched primary alkyls. In some embodiments, $R_1$ and $R_2$ groups are selected from the group consisting of methyl, ethyl, n-propyl, n-butyl, isobutyl, neopentyl, and 2-ethylhexyl. In some embodiments, $R_1$ and $R_2$ groups are selected from the group consisting of ethyl, isobutyl, and neopentyl.

In some embodiments, $R_3$ to $R_5$ are hydrogen and $R_6$ is selected from the group consisting of a branched alkyl, cycloalkyl, aryl, arylalkyl and alkylaryl radical having from 3 to 10 carbon atoms. In some embodiments, at least two radicals from $R_3$ to $R_6$ are different from hydrogen and are selected from the group consisting of C1-C20 linear or branched alkyl, alkenyl, cycloalkyl, aryl, arylalkyl or alkylaryl group, optionally containing heteroatoms. In some embodiments, the two radicals different from hydrogen are linked to the same carbon atom. In some embodiments, when at least two radicals different from hydrogen are linked to different carbon atoms, $R_3$ and $R_5$ are the radicals. In some embodiments, when at least two radicals different from hydrogen are linked to different carbon atoms, $R_4$ and $R_6$ are the radicals.

In some embodiments, the electron-donors are selected from the group of 1,3-diethers described in European Patent Application Nos. EP-A-361 493 and EP 0 728769, both incorporated herein by reference in their entirety.

In some embodiments, cocatalysts (2) are trialkyl aluminum compounds. In some embodiments, the trialkyl aluminum compounds are selected from the group consisting of Al-triethyl, Al-triisobutyl and Al-tri-n-butyl.

In some embodiments, the electron-donor compounds (3) that are used as external electron-donors (added to the Al-alkyl compound) are made from or contain a compound selected from the group consisting of aromatic acid esters, heterocyclic compounds, and silicon compounds containing at least one Si—OR bond (where R is a hydrocarbon radical). In some embodiments, the aromatic acid esters are alkylic benzoates. In some embodiments, the heterocyclic compounds are selected from the group consisting of 2,2,6,6-tetramethylpiperidine and 2,6-diisopropylpiperidine. In some embodiments, the silicon compounds are those of formula $R_a^1 R_b^2 Si(OR^3)_c$, where a and b are integer numbers from 0 to 2, c is an integer from 1 to 3 and the sum (a+b+c) is 4; $R^1$, $R^2$, and $R^3$ are alkyl, cycloalkyl or aryl radicals with 1-18 carbon atoms optionally containing heteroatoms.

In some embodiments, the silicon compound is thexyltrimethoxysilane (2,3-dimethyl-2-trimethoxysilyl-butane).

In some embodiments, the previously-described 1,3-diethers are external donors. In some embodiments, when the internal donor is a 1,3-diether, the external donor is omitted.

In some embodiments, the catalysts are precontacted with small quantities of olefin (prepolymerization), maintaining the catalyst in suspension in a hydrocarbon solvent, and polymerizing at temperatures from room to 60° C., thereby producing a quantity of polymer from 0.5 to 3 times the weight of the catalyst.

In some embodiments, the copolymer also contains additives. In some embodiments, the additives are selected from the group consisting of nucleating and clarifying agents and processing aids.

In a general embodiment, the propylene 1-hexene copolymer is used for the production of films. In some embodiments, the film is a cast or biaxially-oriented polypropylene (BOPP) film. In some embodiments, the film can be a monolayer film or a multilayer film wherein at least one layer is made from or contains the propylene 1-hexene copolymer.

The following examples are given to be illustrative without limiting the scope of this disclosure in any manner whatsoever.

EXAMPLES

The data relating to the polymeric materials and the films of the examples are determined by way of the methods reported below.

Melting Temperature (ISO 11357-3)

Determined by differential scanning calorimetry (DSC). A sample weighing 6±1 mg, was heated to 200±1° C. at a rate of 20° C./min and kept at 200±1° C. for 2 minutes in nitrogen stream and then was cooled at a rate of 20° C./min to 40±2° C., and then kept at this temperature for 2 min. Then, the sample was again melted at a temperature rise rate of 20° C./min up to 200° C.±1. The melting scan was recorded, a thermogram was obtained (° C. vs. mW), and, from the thermogram, temperatures corresponding to peaks were read. The temperature corresponding to the most intense melting peak recorded during the second fusion was recorded as the melting temperature.

Melt Flow Rate (MFR)

Determined according to ASTM D 1238, at 230° C., with a load of 2.16 kg.

Solubility in Xylene at 25° C.

2.5 g of polymer and 250 ml of xylene are introduced in a glass flask equipped with a refrigerator and a magnetical stirrer. The temperature was raised in 30 minutes up to the boiling point of the solvent. The solution was then kept under reflux and stirring for further 30 minutes. The closed flask was then kept for 30 minutes in a bath of ice and water and in thermostatic water bath at 25° C. for 30 minutes as well. The solid formed was filtered on quick filtering paper. 100 ml of the filtered liquid was poured in a pre-weighed aluminium container, which was heated on a heating plate under nitrogen flow, to remove the solvent by evaporation. The container was then kept in an oven at 80° C. under vacuum until constant weight was obtained. The weight percentage of polymer soluble in xylene at room temperature was then calculated.

Intrinsic Viscosity (IV)

Determined in tetrahydronaphthalene at 135° C.

Determination of 1-Hexene Content by NMR $^{13}$C NMR spectra were acquired on an AV-600 spectrometer operating at 150.91 MHz in the Fourier transform mode at 120° C. The peak of the propylene CH was used as internal reference at 28.83. The $^{13}$C NMR spectrum was acquired using the following parameters:

| | |
|---|---|
| Spectral width (SW) | 60 ppm |
| Spectrum centre (O1) | 30 ppm |
| Decoupling sequence | WALTZ 65_64pl |
| Pulse program | ZGPG |
| Pulse Length (P1) | for 90° |
| Total number of points (TD) | 32K |
| Relaxation Delay | 15 s |
| Number of transients | 1500 |

The total amount of 1-hexene, as molar percent, was calculated from diad using the following relations:

$$[P]=PP+0.5PH$$

$$[H]=HH+0.5PH$$

Assignments of the $^{13}$C NMR spectrum of propylene/1-hexene copolymers have been calculated according to the following table:

| Area | Chemical Shift | Assignments | Sequence |
|---|---|---|---|
| 1 | 46.93-46.00 | $S_{\alpha\alpha}$ | PP |
| 2 | 44.50-43.82 | $S_{\alpha\alpha}$ | PH |
| 3 | 41.34-4.23 | $S_{\alpha\alpha}$ | HH |
| 4 | 38.00-37.40 | $S_{\alpha\gamma}+S_{\alpha\delta}$ | PE |
| 5 | 35.70-35.0 | $4B_4$ | H |
| 6 | 35.00-34.53 | $S_{\alpha\gamma}+S_{\alpha\delta}$ | HE |
| 7 | 33.75 33.20 | CH | H |
| 8 | 33.24 | $T_{\delta\delta}$ | EPE |
| 9 | 30.92 | $T_{\beta\delta}$ | PPE |
| 10 | 30.76 | $S_{\gamma\gamma}$ | XEEX |
| 11 | 30.35 | $S_{\gamma\delta}$ | XEEE |
| 12 | 29.95 | $S_{\delta\delta}$ | EEE |
| 13 | 29.35 | $3B_4$ | H |
| 14 | 28.94-28.38 | CH | P |
| 15 | 27.43-27.27 | $S_{\beta\delta}$ | XEE |
| 16 | 24.67-24.53 | $S_{\beta\beta}$ | XEX |
| 17 | 23.44-23.35 | $2B_4$ | H |
| 18 | 21.80-19.90 | $CH_3$ | P |
| 19 | 14.22 | $CH_3$ | H |

Seal Initiation Temperature (SIT)

Preparation of the Film Specimens

Some films with a thickness of 50 μm were prepared by extruding each test composition in a single screw Collin extruder (length/diameter ratio of screw 1:25) at a film drawing speed of 7 m/min and a melt temperature of 210-250° C. Each resulting film was superimposed on a 1000 μm thick film of a propylene homopolymer having a xylene insoluble fraction of 97 wt % and a MFR L of 2 g/10 min. The superimposed films were bonded to each other in a Carver press at 200° C. under a 9000 kg load, which was maintained for 5 minutes. The resulting laminates were stretched longitudinally and transversally, that is, biaxially, by a factor 6 with a TOM Long film stretcher at 150° C., thereby obtaining a 20 μm thick film (18 μm homopolymer+2 μm test). 2×5 cm specimens were cut from the films.

Determination of the SIT.

For each test, two of the specimens were superimposed in alignment, the adjacent layers being layers of the test composition. The superimposed specimens were sealed along one of the 2 cm sides with a Brugger Feinmechanik Sealer, model HSG-ETK 745. Sealing time was 5 seconds at a pressure of 0.1 N/mm$^2$. The sealing temperature was increased by 2° C. for each seal, starting from about 10° C. less than the melting temperature of the test composition. The sealed samples were left to cool and then the unsealed ends were attached to an Instron machine where the samples were tested at a traction speed of 50 mm/min.

As used herein, the SIT is the minimum sealing temperature at which the seal does not break when a load of at least 2 Newtons is applied in the test conditions.

Determination of the Haze

50 μm film specimens were prepared as described for the SIT measurements. The haze value was measured using a Gardner photometric unit connected to a Hazemeter type UX-10 or an equivalent instrument having G.E. 1209 light source with filter "C". Reference samples were used for calibrating the instrument.

Preparation of the Copolymer of Propylene with 1-Hexene

The copolymer was prepared as follows.

The solid catalyst component used in polymerization was a highly stereospecific Ziegler-Natta catalyst component supported on magnesium chloride, containing about 2.2% by weight of titanium and diisobutylphthalate as internal donor, prepared by analogy with the method described in Patent Cooperation Treaty Publication No. WO03/054035, incorporated herein by reference, for the preparation of catalyst component A.

Catalyst System and Prepolymerization Treatment

The solid catalyst component was contacted at 15° C. for about 6 minutes with aluminum triethyl (TEAL) and thexyltrimethoxysilane (2,3-dimethyl-2-trimethoxysilyl-butane), in a TEAL/thexyltrimethoxysilane weight ratio equal to about 7 and in such quantity that the TEAL/solid catalyst component weight ratio was equal to about 6.

The catalyst system was then subjected to prepolymerization by maintaining the catalyst system in suspension in liquid propylene at 20° C. for about 20 minutes.

Polymerization Example 1

The polymerization was carried out in two gas phase polymerization reactors by feeding in a continuous and constant flow the prepolymerized catalyst system, hydrogen (used as molecular weight regulator), propylene and 1-hexene in the gas state.

The main polymerization conditions are reported in table 1

TABLE 1

| | | first reactor | second reactor |
|---|---|---|---|
| Temperature: | ° C. | 75 | 75 |
| Pressure | bar-g | 16 | 16 |
| residence time | min | 46 | 46 |
| C6/C6 + C3 | mol/mol | 0.010 | 0.022 |
| H2/C3 | mol/mol | 0.016 | 0.017 |

C3 = propylene;
C6 = 1-hexene
H2 = hydrogen

The polymer particles exiting the reactor were subjected to a steam treatment to remove the reactive monomers and volatile substances, and then dried.

The property of the copolymer obtained in example 1 are reported in table 2.

TABLE 2

|  |  | Ex 1 | comp ex 2 |
|---|---|---|---|
| 1-hexene content | wt % | 7.4 | 7.3 |
| MFR | g/10 min | 4.4 | 0.3 |
| xylene solubles 25° C. | wt % | 18.0 | 18.1 |
| melting temperatures | ° C. | 135.1-143.7 | 132.2 one peak |
| Height DSC | mW | 22-24 | nm |
| Haze (film) | % | 0.55 | 3 |
| SIT | ° C. | 91° C. | nm | nm = not measured

Comparative example 2 was a copolymer prepared according to the description of the example in Patent Cooperation Treaty Publication No. WO 2009/077287, incorporated herein by reference, wherein haze on a cast 50 µm film was measured.

What is claimed is:

1. A film comprising:
   (i) a propylene 1-hexene copolymer comprising:
      from about 5.5 to about 9.0% by weight, based upon a total weight of the copolymer, of 1-hexene derived units having
      a) two melting temperature peaks in the DSC plot having a difference in height ranging from about 0 to about 5 mW;
      b) a higher melting temperature, measured by DSC, ranging from about 141.0° C. to about 151.0° C.; and
      c) Melt Flow Rate (MFR, measured according to ASTM D 1238, 230° C./2.16 kg) from about 3.5 to about 8.0 g/10 min.

2. The film according to claim 1, wherein the film is a biaxially-oriented polypropylene film.

3. The film according to claim 1, wherein the propylene 1-hexene copolymer comprises from about 6.0 to about 8.5% by weight of 1-hexene derived units.

4. The film according to claim 1, wherein the propylene 1-hexene copolymer comprises from about 6.5 to about 8.0% by weight of 1-hexene derived units.

5. The film according to claim 1, wherein the propylene 1-hexene copolymer has a solubility in xylene at 25° C. equal to or lower than 25% by weight, based upon the total weight of the copolymer, and higher than 12 wt %.

6. The film according to claim 5, wherein the propylene 1-hexene copolymer has a solubility in xylene at 25° C. equal to or lower than 20% by weight, based upon the total weight of the copolymer, and higher than 12 wt %.

7. The film according to claim 1, wherein the propylene 1-hexene copolymer has a Melt Flow Rate ranging from about 3.8 to about 7.5 g/10 min.

8. The film according to claim 1, wherein the propylene 1-hexene copolymer has a Melt Flow Rate ranging from about 4.0 to about 6.0 g/10 min.

* * * * *